A. W. Gifford,

Scissors Sharpener.

No 2,674. Reissued July 9, 1867.

Witnesses

A. W. Blackington

Wm Dean Overell

Inventor

A. W. Gifford

Per Munn & Co

Attorneys

N. PETERS, PHOTO-LITHOGRAPHER, WASHINGTON, D. C.

United States Patent Office.

HENRY D. WARD AND WILLIAM A. RICHARDSON, OF WORCESTER, MASSACHUSETTS, ASSIGNEES BY MESNE ASSIGNMENTS OF A. W. GIFFORD.

*Letters Patent No.* 62,023, *dated February* 12, 1867; *reissue No.* 2,674, *dated July* 9, 1867.

IMPROVED SCISSORS-SHARPENER.

The Schedule referred to in these Letters Patent and making part of the same.

TO ALL WHOM IT MAY CONCERN:

Be it known that the following is a full, clear, and exact description of a new and improved Scissors-Sharpener, the invention of A. W. GIFFORD, of Worcester, in the county of Worcester, and State of Massachusetts, reference being had to the accompanying drawing, forming part of this specification, and in which—

Figure 1:
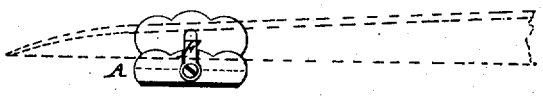

Figure 1 is a view of one side of the implement, showing a blade of a pair of scissors as in the act of being drawn through the same.

Figure 3:
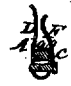
Figure 2:
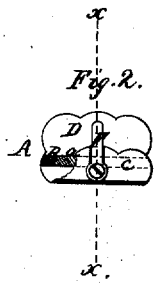

Figure 2, a similar view, but with the frame partly broken in exhibition of the sharpening-bar of the implement; and Figure 3 a transverse section, taken as denoted by the line *x x* in fig. 2.

Similar letters of reference indicate like parts.

This invention relates to a novel and simple instrument or implement designed to be used for the sharpening of scissors, whereby the cutting edges of the same can be sharpened with the utmost ease, facility, and dispatch.

Referring to the accompanying drawing, A represents the frame of the implement, which, in the present instance, is made of a thin sheet of metal of suitable size, bent at one end or edge, with a steel bar, B, held in and between the two sides of the frame, in any suitable manner, and having its upper edge formed with a series of sharp teeth or serrations, *a a*, extending across its width, said upper edge being bevelled or inclined, substantially as shown in fig. 3. Over this toothed bar, between the two sides C and D of the frame which serve as guides, the cutting or bevelled edges of the scissors blades are drawn one at a time in a proper direction for the teeth of such bar to act upon the same, and thus impart a sharp cutting edge thereto. F represents a bent spring, which may be employed, if necessary, or considered advisable, to aid in holding and bearing the scissors blade firmly against the side D of the frame A, as said blade is drawn over the toothed bar; but such spring, it will be obvious, is not absolutely essential, and may be dispensed with.

From the foregoing description it is plain to be seen that a sharpener for scissors is produced by this improvement, which is not only simple and cheap, but practicable and efficient in operation, desiderata of the utmost importance.

The under side of the sharpening-bar B may be roughened or serrated similar to its upper side or edge, so that when one side has become useless the other can be used by reversing the bar edgewise.

What is here claimed as new and useful, and desired to be secured by Letters Patent, is—

A scissors-sharpener, constructed substantially as described, of a serrated bar or file B, in combination with and arranged between sides or guides D C of a frame or holder, for use as specified.

H. D. WARD,
WM. A. RICHARDSON.

Witnesses:
S. B. I. GODDARD,
CHAS. F. CARR.